T. A. EDISON.
MEANS FOR UTILIZING THE WASTE HEAT IN KILNS.
APPLICATION FILED NOV. 25, 1908.
1,148,832.
Patented Aug. 3, 1915
4 SHEETS—SHEET 1
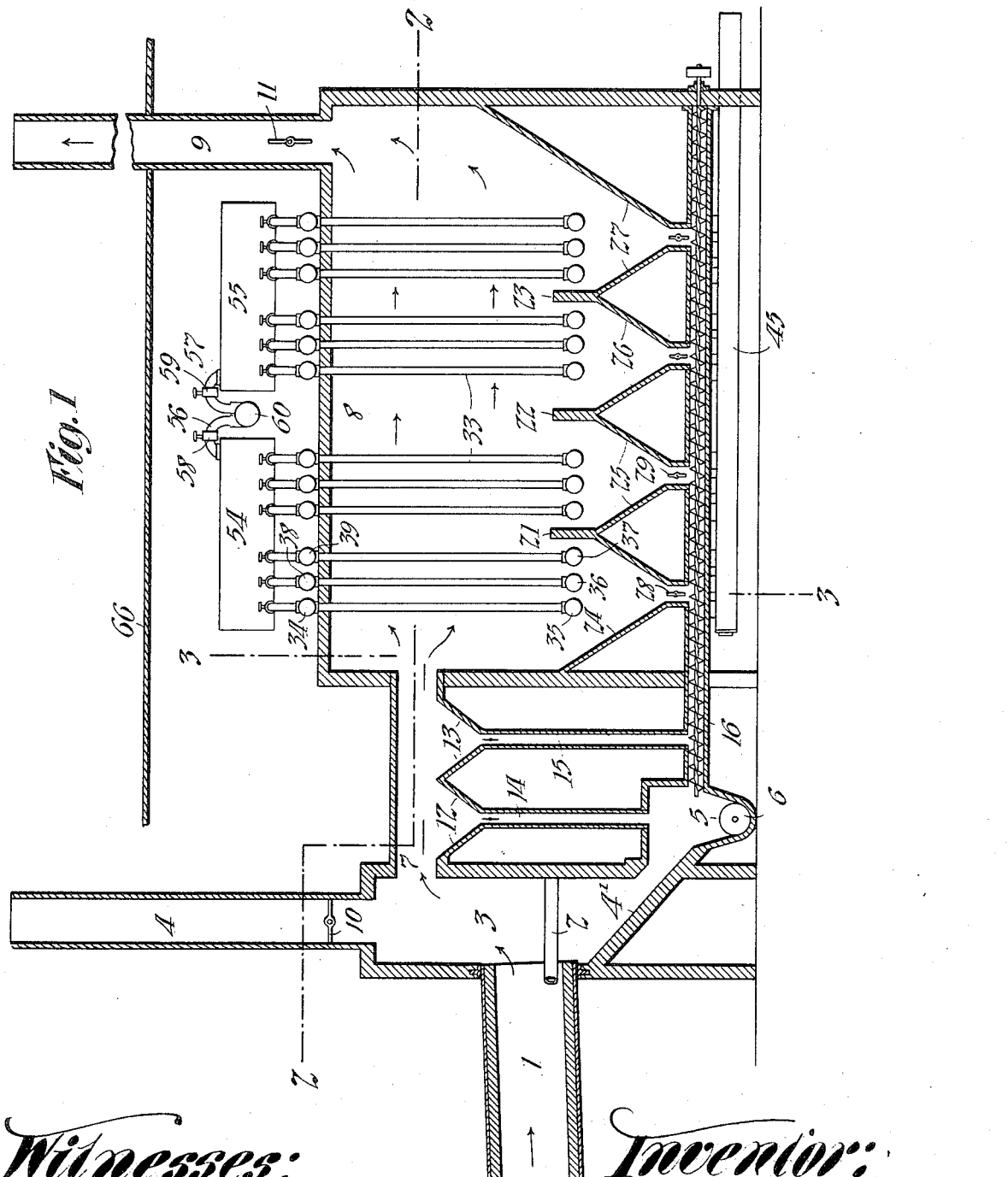
Witnesses:
Frank D. Lewis
Dyer Smith
Inventor:
Thomas A. Edison
by Frank L. Dyer
Atty.

T. A. EDISON.
MEANS FOR UTILIZING THE WASTE HEAT IN KILNS.
APPLICATION FILED NOV. 25, 1908.
1,148,832.
Patented Aug. 3, 1915.
4 SHEETS—SHEET 2.
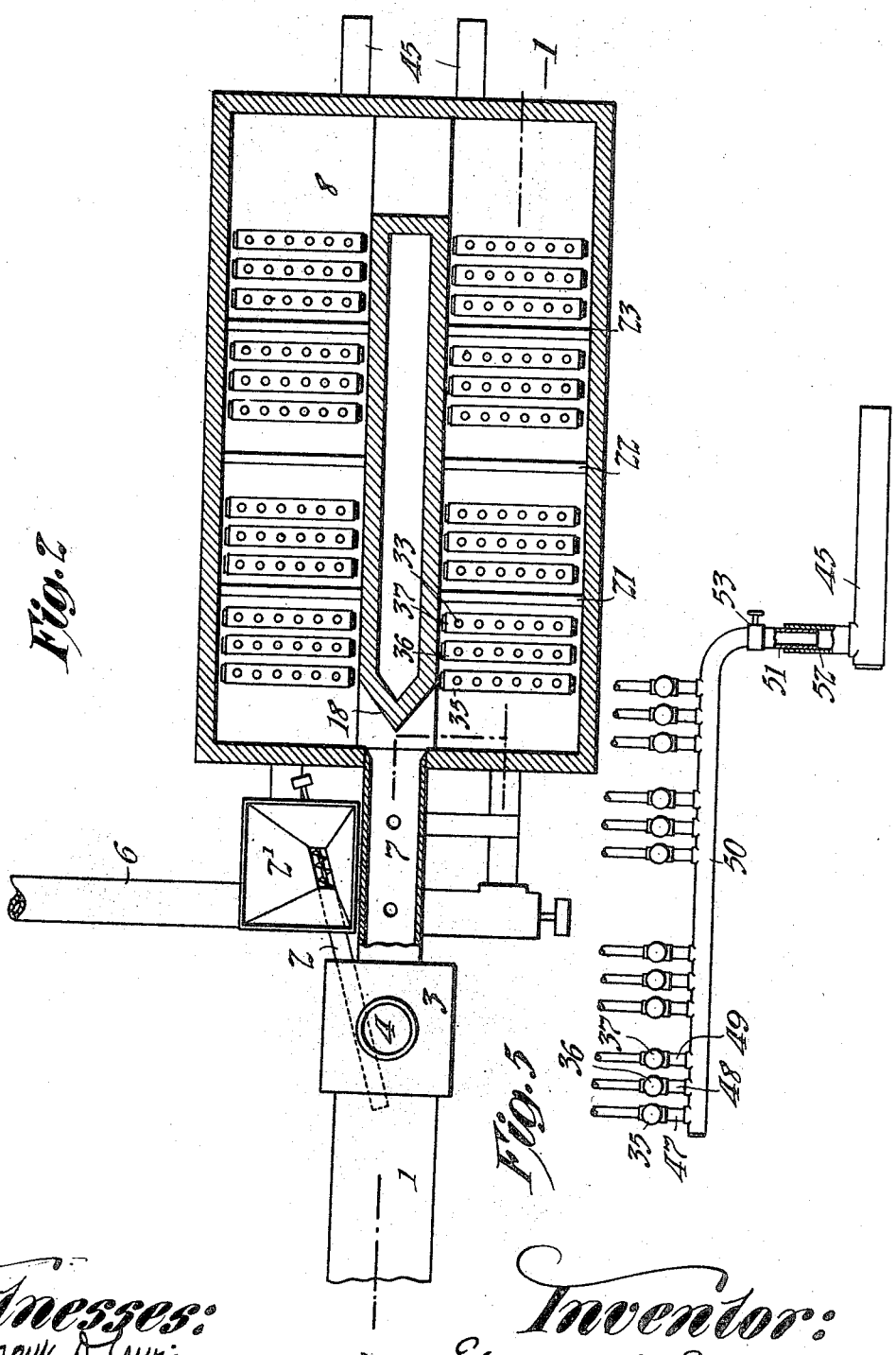

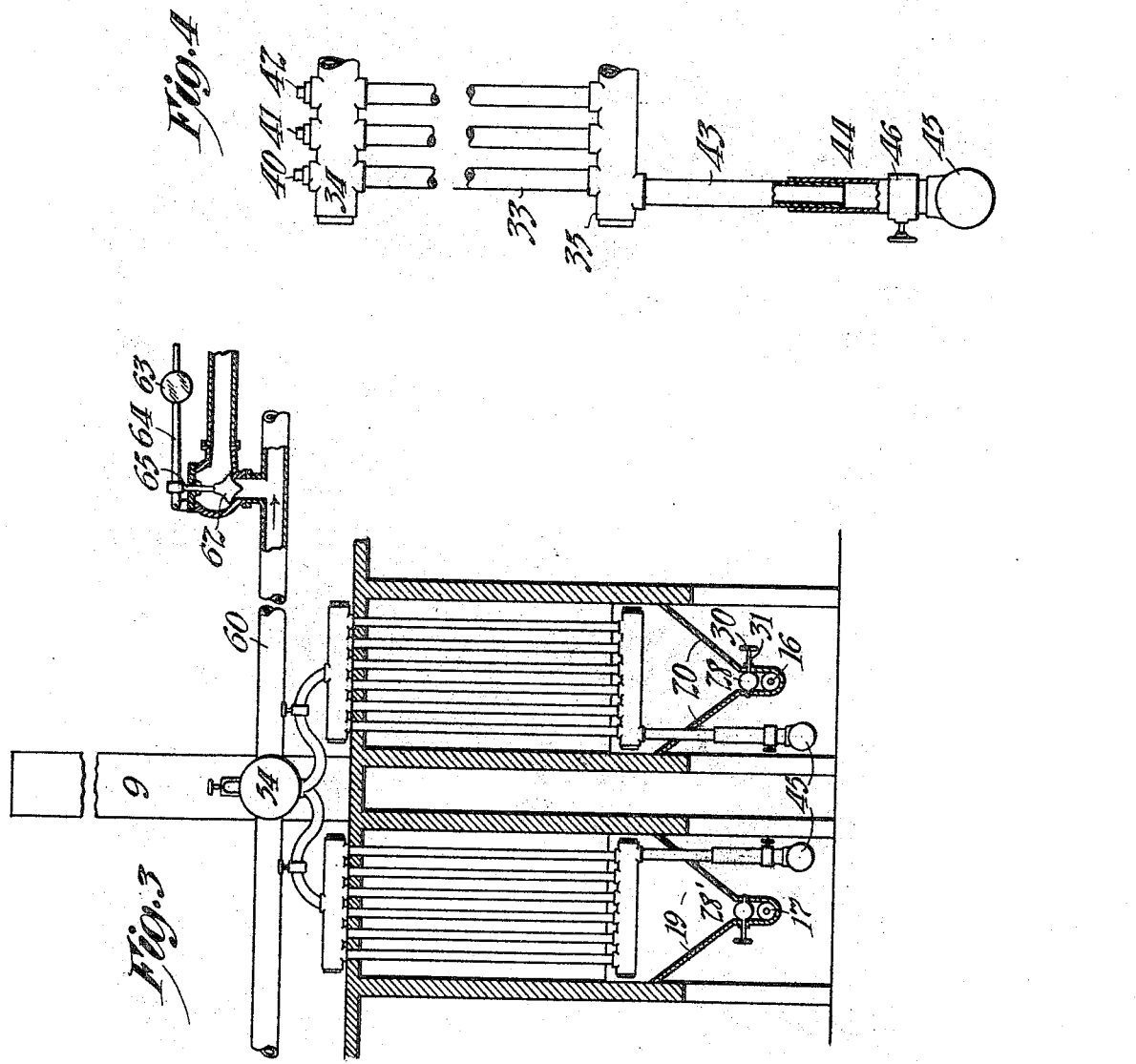

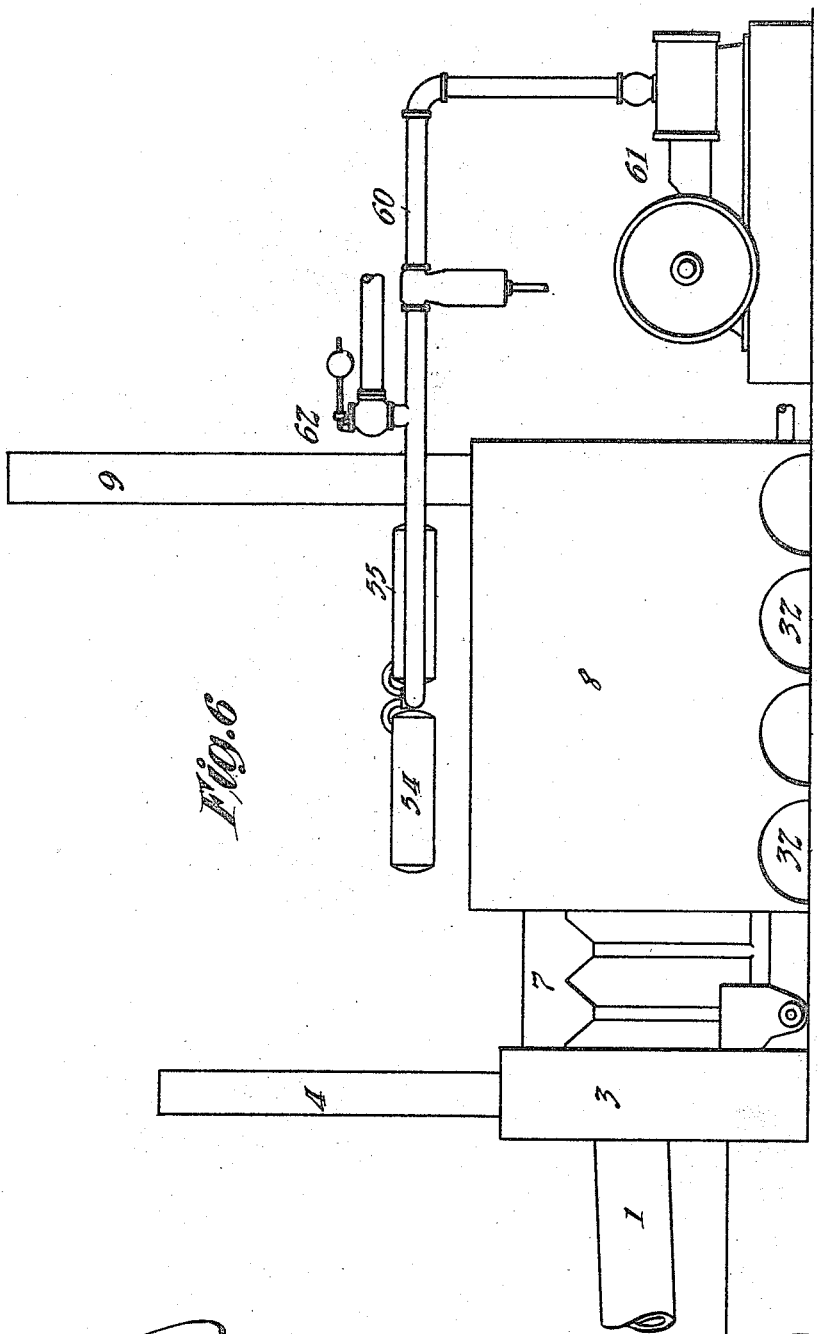

UNITED STATES PATENT OFFICE.

THOMAS A. EDISON, OF LLEWELLYN PARK, WEST ORANGE, NEW JERSEY.

MEANS FOR UTILIZING THE WASTE HEAT IN KILNS.

1,148,832.   Specification of Letters Patent.   Patented Aug. 3, 1915.

Application filed November 25, 1908. Serial No. 464,410.

*To all whom it may concern:*

Be it known that I, THOMAS A. EDISON, a citizen of the United States, and a resident of Llewellyn Park, West Orange, county of Essex, and State of New Jersey, have made a certain new and useful Invention in Improvements in Means for Utilizing the Waste Heat in Kilns, of which the following is a description.

This invention relates to rotary cement kilns, and the object thereof is to utilize the waste hot gases escaping from such kilns for the generation of steam, especial attention being directed to the prevention of trouble due to the dust which accompanies the waste gases when the latter escape from a modern rotary cement kiln, and also to the prevention of interference with the draft of the kiln.

A number of attempts have been made by various experimenters to utilize the waste gases from cement kilns, but a great deal of trouble has always been experienced in such cases from dust. Likewise, in such attempts prior to my invention, serious disturbance of the draft of the kiln has been occasioned, due to the fact that the generation of steam in the utilization of the heat in the waste gases has been variable. In many such cases, methods of regulation of the amount of steam so generated have been used, by which only such a quantity of steam as was called for by the consumption of the engine using the same was generated. In such a case, the amount of heat abstracted from the waste gases by the steam generator is variable, resulting in a variable temperature of the waste gases at the entrance to the stack, and consequent variations in the draft caused by the stack. This makes it impossible to properly control the kiln reactions. Furthermore, the problem is not satisfactorily solved by the use of a forced draft, since if the temperature of the gases is not maintained constant, their volume will likewise vary, and the exhauster or equivalent device would have to be speeded up, if the gases became hotter and consequently were expanded to a greater volume, to pass the same amount of free air into the extreme or exit end of the kiln.

My present invention is based on the observation that the problem of the nondisturbance of the draft of the kiln is only susceptible of solution by the generation of a constant quantity of steam, regardless of the consumption of the engine, or whether the latter is running at all or not. Accordingly, in my invention I contemplate the generation of a constant quantity of steam, somewhat greater than the maximum amount to be used by the engine, the balance of the steam generated escaping through a safety valve or equivalent device. Probably in most cases, the engine could be furnished with eighty-five to ninety per cent. of the steam generated without endangering the draft of the kiln.

My invention accordingly consists in the provision of a steam generator for utilizing the heat of the waste gases escaping from the kiln, without interfering with the draft of the kiln, said generator being designed to operate efficiently, troubles due to dust being obviated, and also the other difficulties to which mechanisms of this type are subject, such as those caused by expansion and contraction of the members, and similar difficulties of a mechanical nature.

The invention further consists in various details of construction and combination of parts necessary to carry out the invention, as will be more particularly described hereafter and pointed out in the appended claims.

The invention also consists in the method of utilizing the waste heat of the gases without interfering with the draft of the kiln, consisting in generating a constant quantity of steam, greater than any demands which will be made upon it, utilizing as much as is desired of this supply, and exhausting the remainder, and furthermore, in maintaining the draft the same, when the chamber containing the steam generator is cut out of the circuit of the gases for repair or any other purpose, as will be hereinafter more particularly described and pointed out in the appended claims.

For a clearer comprehension of my invention, attention is directed to the accompanying drawings, forming part of this specification, and in which—

Figure 1 is a vertical cross section showing my invention taken on the line 1—1 of Fig. 2. Fig. 2 is a horizontal section of the same, taken on line 2—2 of Fig. 1. Fig. 3 is a transverse cross section through the large dust chamber, taken on the line 3—3 of Fig. 1, and looking to the right. Fig. 4 is a detail view showing the arrangement of the steam generator pipes of one unit or grid, and the connection of the same with the blow-off pipe. Fig. 5 is a detail view showing an arrangement in which the blow-off legs of all the grids or of a certain part of them may be connected together to be blown off together, and Fig. 6 is a diagrammatic view showing the arrangement of all the parts and the connection of piping to the engine.

Similar reference characters represent corresponding parts in the several views.

Referring to the drawings, 1 represents a rotary cement kiln such as is used in modern practice, and preferably one of large capacity, such as is described in my Letters Patent No. 802,631, granted October 24, 1905. This kiln is supplied with the cement material or "chalk" by a screw conveyer 2, the material being fed to the conveyer from a hopper 2', as is common in the art. The hot gases, the products of the combustion in the kiln, pass from the upper or right hand end of the kiln, as shown in the drawings, into the chamber 3, which is furnished with a stack 4. This is the usual dust settling chamber common to rotary cement kilns of this type. Chamber 3 is furnished with a slanting bottom plate 4', so that the chalk or dust which settles in this chamber falls on the inclined plate 4', and slides into the boot 5, at the bottom of which is located a continuously operating conveying means represented by the screw conveyer 6. All the dust transported by this conveyer is carried to an elevator, not shown, which loads the same into the feed of raw material to be again fed into the kiln 1.

In the normal operation of this device, the waste hot gases pass from chamber 3 into hot air pipe 7, through which they pass into the large dust settling chamber 8, through which in turn, they pass and escape by means of the stack 9. The stacks 4 and 9 are equipped respectively with valves or dampers 10 and 11, by means of which either stack may be closed. In operation, as contemplated by my invention, the stack 4 is normally closed, the stack 9 being open, as shown in Fig. 1 of the drawings, and the hot gases passing through chamber 8 and stack 9, but if it is desired to cut out settling chamber 8 for the purpose of repairs or the like, damper 10 in stack 4 is opened, damper 11 in stack 9 being closed. Hot air pipe 7 is provided with inclined bottom plates 12 and 13, by means of which any dust settling in this pipe may be brought to pipes 14 and 15, which direct it to boot 5 and conveyer 6 therein, to be conveyed back to the kiln feed.

The large dust chamber 8 is provided throughout its entire length with continuously operating conveying means which transport all dust deposited in said chamber to the boot 5, and deliver the same to the main conveyer 6. One such conveyer is shown in Fig. 1 of the drawings as the screw conveyer 16. The dust settling chamber 8, there being one such chamber provided for each kiln, is divided into two sections longitudinally of the same for reasons which will presently be pointed out, each division of the chamber being provided with its own screw conveyer 16 or 17, as shown in Fig. 3 of the drawings. This division of the chamber is effected by means of the partition or baffle plates 18, shown in Figs. 2 and 3 of the drawings. Each division of the chamber 8 is provided at the bottom thereof with inclined sides 19, 20, which direct any dust settled in said chamber toward the screw conveyers 16 and 17. The dust chamber 8 is also preferably divided into sections longitudinally thereof, as by means of the partitions 21, 22 and 23 shown in Fig. 1 of the drawings. These longitudinal sections are furnished with slanting sides at the bottom thereof, as indicated in Fig. 1 at 24, 25, 26 and 27. Each one of these sections may be furnished with a valve or removable bottom in the narrow neck thereof, as shown in the drawings at 28, 28', 29, etc. These valves may be manipulated as by hand wheel 30 rotating spindle 31, on which the valve 28 is mounted, as shown in Fig. 3 of the drawings, so that the dust collected in each dust hopper or section may be unloaded by an attendant onto the conveyer. The space between the dust hoppers or sections above referred to may be arched as indicated at 32 in Fig. 6 of the drawings, to allow an attendant to walk therethrough and manipulate the various valves.

The dust settling chamber 8 is provided with a series of vertical pipes 33 forming part of the steam generating apparatus for utilizing the waste heat of the hot gases passing through chamber 8. As indicated in Fig. 4 of the drawings, a number of these vertical pipes 33 are connected together at their upper ends to a single horizontal head or drum 34, and at the bottom to a similar head or drum 35. These heads 34, 35 are shown in Fig. 1 of the drawings as extending across the chamber 8, and each pair of heads 34, 35 with its connected gang of pipes, constitutes a single unit or grid. There may be as many as forty of these grids in a dust chamber such as 8. The lower heads of these grids as 35, 36 and 37 extend down below the tops of the partitions 21, 22 and 23, so that the grids are divided into groups thereby. These units or grids are fastened to the frame work only at one point, preferably at the upper end at the heads 34, 38, 39, etc. The lower heads 35, 36, 37, etc., not being fixed, are free to have vertical play, thus taking care of whatever expansion and contraction there may be in the grids on account of changing temperatures. Each upper head, as 34, is preferably provided with a series of caps, as shown at 40, 41 and 42 in Fig. 4 of the drawings, which caps may be unscrewed for the purpose of cleaning out scale in the vertical tubes 33, etc. in alinement with said caps 40, 41, 42, etc.

The grids are furnished with means for blowing off the same. This may consist, as shown in Fig. 4 of the drawings, of a blow-off leg 43 connected with lower head 35 of each unit, by means of which each such unit may be blown off to clear out the mud, etc., in the same. As shown in Fig. 4, blow-off leg 43 has a telescopic connection with sleeve 44, connected with horizontal blow-off pipe 45. This connection is controlled by valve 46, which can be opened by the attendant to blow out the grid. It may be preferred, however, to blow off a number of the grids or all the grids connected with one main steam drum, to be later described, at the same time. Such an arrangement is indicated in Fig. 5 of the drawings in which the lower heads of the various units as 35, 36, 37 are connected by means of blow-off legs 47, 48, 49, etc., with the horizontal blow-off pipe 50, vertical arm 51 of which has a sliding fit in sleeve 52 opening into main blow-off pipe 45. In this case, the blow-off valve 53 governs the blow-off of all the various grids connected to pipe 50. A construction such as the one disclosed in either Fig. 4 or Fig. 5, in which the grids are fixed at only one point, obviates difficulties due to unequal expansion and contraction, and at the same time, trouble of leaking at the joints is not likely to occur, since the temperatures of the gases passing through the various pipes is not so high as that to be found in the other steam boilers, the temperatures of the gases not rising above a red heat.

The various grids are connected with steam drums, of which there are preferably two, 54, 55, for each chamber such as 8. Half of the grids may be connected to drum 54, and half to drum 55. The grids fill the two divisions of chamber 8, but none are provided directly under steam drums 54 and 55, which are mounted centrally of chamber 8, and longitudinally thereof, so that they are placed directly over partition 18. The object of this construction is that no grids may be directly under the steam drums, in order that the grids may be the more easily removed, and that the tubes thereof may be cleaned of scale, etc. The gases entering chamber 8 through hot air pipe 7 are deflected by the advance end of baffle plates or partition 18, so that the gases pass entirely around and among the vertical pipes 33. Baffle plates 18 extend from the top of the chamber to a point below the lower heads 35 and 36, etc. of the grids. The object of dividing the dust chamber into two sections as shown is to diminish the width of each steam section, and also to make possible the use of two unloading screws 16 and 17, thereby arranging the parts in a more compact manner and diminishing the necessary height of the chamber 8.

The steam drums 54 and 55 are connected as by pipes 56 and 57 provided with valves 58 and 59 to the main steam pipe 60. Steam is conveyed by pipe 60 to the steam engine shown diagrammatically in Fig. 6 of the drawings at 61 or other means which it is intended to supply with steam from this source. The supply of steam in steam pipe 60 is approximately constant in volume and pressure, since the quantity and temperature of the gases entering chamber 8 from hot air pipe 7 are approximately constant, and an approximately constant quantity of water is evaporated thereby during each unit of time in the grid. This steam supply is designed to be slightly in excess of the requirements of the engine 61. The remainder of the steam furnished to pipe 60 is allowed to exhaust through valve 62, which is of the safety valve type. This valve may be adjusted as by setting the weight 63 thereof on the lever arm 64, which is connected to the spindle 65 of the valve for whatever amount of steam it is desired to take in the engine 61. Since, according to the design of the system, the steam supply in pipe 60 is always slightly in excess of the requirements of the engine, there will be a constant exhaust of this residue through the valve 62. This amount of constant loss need only be slight, as previously stated. When the engine 61 is stopped, the whole flow of steam in pipe 60 will escape through valve 62.

By the means described, the constancy of the draft through chamber 8 is not interfered with, owing to the constant and uniform abstraction of heat from the gases by the pipe grids. Should, however, chamber 8 be closed for repairs, the draft is furnished by stack 4 of chamber 3, and the draft so furnished should be the same as that furnished at other times by stack 9. This may be accomplished by giving stack 4 the proper cross section and height to produce the desired draft for kiln 1, and designing stack 9 with such an additional height as to compensate for the loss of draft which would occur if a stack having only the height of stack 4 were used at the location of stack 9, due to the abstraction of heat from the waste gases by the steam generating system in chamber 8.

In operation, when the dust collects in sufficient quantity in hoppers 24, 25, etc., the attendant partially unloads the dust from the various sections, one at a time, by manipulation of the gates 28, 29, etc. The dust should not be allowed to rise in the various sections to such a height as to reach the bottom drums of the pipe grids. The tubes being vertical, do not collect dust, except for a small quantity on the top of the bottom drums or heads 35, 36, etc., which reaches a certain point and unloads itself automatically thereafter. A corrugated iron roof 66 is provided over the top of the dust chamber 8, there being, however, no sides. This roof is provided with removable sections to permit a section or grid to be raised out of the chamber vertically.

It is obvious that various changes may be made in the details of construction as above described without departing from the spirit of my invention.

Having now described my invention, what I claim and desire to secure by Letters Patent of the United States is as follows:

1. In apparatus of the character described, the combination with a kiln, of a settling chamber directly connected thereto, an auxiliary settling chamber, a hot air pipe connecting the two chambers, so that waste kiln gases pass through them successively, and steam generating appliances located in said auxiliary settling chamber, substantially as described.

2. In apparatus of the character described, the combination with a kiln, of a pair of settling chambers connected together and to the kiln, a device in the chamber the more distant from the kiln for abstracting heat from the waste hot gases to do useful work, a stack for each chamber and devices for opening and closing communication between each stack and its chamber, the stack of the more distant chamber being so proportioned as to furnish a draft approximately equal, when all the hot gases are passed therethrough, to that furnished by the other stack when all the hot gases are passed therethrough, substantially as described.

3. In apparatus of the character described, the combination with a kiln, of a settling chamber connected with the kiln to form a passageway for the waste gases issuing from the kiln, steam generative appliances in said chamber, and means insuring the removal of steam from said generative appliances at a constant rate, substantially as described.

4. In apparatus of the character described, the combination with a kiln, of a settling chamber connected with the kiln to form a passageway for the waste gases issuing from the kiln, steam generative appliances in said chamber and means insuring the removal of steam from said generative appliances at a constant rate, said steam generative appliances having sufficient heating surface presented to the waste gases to cause steam to be constantly generated at such rate while the heat of the waste gases remains constant, substantially as described.

5. In apparatus of the character described, the combination with a kiln, of a chamber connected with the kiln to form a passageway for the waste gases issuing from the kiln, devices in said chamber for abstracting heat from the waste gases passing through said chamber, and means associated with said devices for insuring the abstraction of heat thereby from said gases at a constant rate, substantially as described.

6. In apparatus of the character described, the combination with means for utilizing steam, of a kiln, a chamber connected with the kiln to form a passageway for the waste gases issuing from the kiln, steam generative devices in said chamber constructed and arranged to continuously generate steam at a constant rate greater than the maximum rate of consumption of the steam utilizing means, and a steam pipe connecting the steam generative devices and the steam utilizing means, the said steam pipe being provided with means arranged to permit the constant escape of the steam in excess of that consumed by the steam utilizing means, substantially as described.

7. In apparatus of the class described, the combination with a kiln, of a settling chamber divided into two parts lengthwise in the direction of the passage of the gases therethrough, and steam generative appliances in each division of the chamber, substantially as described.

8. In apparatus of the class described, the combination with a kiln, of a settling chamber connected with the kiln and divided into two parts lengthwise of the direction of passage of the gases therethrough, each part being provided at the bottom thereof with inclined sides, and steam generative appliances in each division of the chamber, said inclined sides being adapted to direct the dust in each division of said chamber away from the steam generator appliances and to positions enabling the ready removal thereof, substantially as described.

9. In apparatus of the class described, the combination with a kiln, of a settling chamber divided into two parts lengthwise of the direction of passage of the gases therethrough, steam generative appliances in each division of the chamber, and baffle plates in the path of the gases as they enter the divided chamber, to cause the gases to pass around the generative appliances, substantially as described.

10. In apparatus of the character described, the combination with a kiln, of a pair of settling chambers adjacent to each other and connected together and to the kiln, a device in the chamber the more distant from the kiln for abstracting the heat from the waste hot gases to do useful work, a stack for each chamber, and devices for opening and closing communication between each stack and its chamber, substantially as described.

This specification signed and witnessed this 21st day of Nov., 1908.

THOS. A. EDISON.

Witnesses:
 DYER SMITH,
 ANNA R. KLEHM.